US009241302B2

(12) United States Patent
Ramachandran et al.

(10) Patent No.: US 9,241,302 B2
(45) Date of Patent: Jan. 19, 2016

(54) METHODS AND APPARATUS FOR RADIO ACCESS TECHNOLOGY SEARCH

(75) Inventors: Shyamal Ramachandran, San Diego, CA (US); Thomas Klingenbrunn, San Diego, CA (US); Bhupesh Manoharlal Umatt, Poway, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 433 days.

(21) Appl. No.: 13/523,291

(22) Filed: Jun. 14, 2012

(65) Prior Publication Data

US 2012/0322446 A1 Dec. 20, 2012

Related U.S. Application Data

(60) Provisional application No. 61/498,413, filed on Jun. 17, 2011.

(51) Int. Cl.
*H04W 36/00* (2009.01)
*H04W 48/18* (2009.01)
(Continued)

(52) U.S. Cl.
CPC .............. *H04W 48/18* (2013.01); *H04W 36/14* (2013.01); *H04W 48/16* (2013.01)

(58) Field of Classification Search
CPC .................... H04W 36/0061; H04W 36/0066; H04W 36/0083; H04W 36/165; H04W 36/20; H04W 36/24; H04W 88/06
USPC ............................... 455/436, 437, 438, 552.1
See application file for complete search history.

(56) References Cited

U.S. PATENT DOCUMENTS

| | | |
|---|---|---|
| 5,398,258 A | 3/1995 | Su et al. |
| 5,729,531 A | 3/1998 | Raith et al. |

(Continued)

FOREIGN PATENT DOCUMENTS

| | | |
|---|---|---|
| CN | 1331891 A | 1/2002 |
| DE | 19915584 | 10/1999 |

(Continued)

OTHER PUBLICATIONS

Digital cellular telecommunications system (Phase 2); Mobile radio interface layer 3 specification; Radio Resource Control (RRC) protocol (3GPP TS 44.018 version 10.2.0 Release 10), Technical specification, European telecommunications standards institute (Etsi), 650, route des lucioles;F-06921 sophia-antipolis; France, vol. 3gpp Geran 2, No. V10.2.0, Mar. 1, 2011, XP014065422.

(Continued)

*Primary Examiner* — Temica M Beamer
(74) *Attorney, Agent, or Firm* — Patterson & Sheridan, L.L.P.

(57) ABSTRACT

Certain aspects of the disclosure relate generally to search of radio access technologies (RAT). For example, certain aspects of the present disclosure relate to a technique for performing higher priority radio access technology (RAT) searches in areas having a plurality of overlapping RATs, such as Global System for Mobile communications (GSM) and Long Term Evolution (LTE). According to certain aspects, a user equipment (UE) may be configured to periodically search for higher priority RATs in neighboring cells. According to certain aspects, upon finding a higher priority RAT cell, the UE may be further configured to evaluate, or "pre-evaluate", criteria for cell reselection from found cell to the currently camped cell, while still camped on the current cell. The UE may be configured to decide whether or not to switch to the found cell based on the evaluation.

28 Claims, 6 Drawing Sheets

(51) Int. Cl.
*H04W 36/14* (2009.01)
*H04W 48/16* (2009.01)

(56) References Cited

U.S. PATENT DOCUMENTS

| | | | |
|---|---|---|---|
| 5,761,623 A * | 6/1998 | Lupien et al. | 455/552.1 |
| 6,016,428 A | 1/2000 | Diachina et al. | |
| 6,108,524 A | 8/2000 | Hershey et al. | |
| 6,259,915 B1 * | 7/2001 | Raith | 455/434 |
| 6,304,756 B1 | 10/2001 | Hebeler et al. | |
| 6,625,132 B1 | 9/2003 | Boettger et al. | |
| 6,747,965 B1 | 6/2004 | Nara et al. | |
| 6,765,891 B2 | 7/2004 | Laitinen et al. | |
| 7,062,271 B2 | 6/2006 | Choi | |
| 7,373,148 B2 | 5/2008 | Kim et al. | |
| 8,340,664 B2 | 12/2012 | Tenny et al. | |
| 2002/0052201 A1 | 5/2002 | Wilhelmsson et al. | |
| 2003/0203735 A1 | 10/2003 | Andrus et al. | |
| 2004/0043798 A1 | 3/2004 | Amerga et al. | |
| 2004/0109431 A1 | 6/2004 | Abrahamson et al. | |
| 2004/0190471 A1 | 9/2004 | Bender et al. | |
| 2004/0192287 A1 | 9/2004 | Namiki et al. | |
| 2005/0245260 A1 | 11/2005 | Nielsen et al. | |
| 2006/0166694 A1 | 7/2006 | Jeong et al. | |
| 2006/0178153 A1 | 8/2006 | Tenny et al. | |
| 2006/0258386 A1 | 11/2006 | Jeong et al. | |
| 2007/0004445 A1 | 1/2007 | Dorsey et al. | |
| 2007/0037577 A1 | 2/2007 | Dalsgaard et al. | |
| 2007/0223510 A1 | 9/2007 | Joo | |
| 2009/0034452 A1 | 2/2009 | Somasundaram et al. | |
| 2009/0067386 A1 | 3/2009 | Kitazoe | |
| 2009/0088160 A1 | 4/2009 | Pani et al. | |
| 2009/0247167 A1 | 10/2009 | Higashide | |
| 2009/0264133 A1 | 10/2009 | Lee et al. | |
| 2010/0184429 A1 | 7/2010 | Tod et al. | |
| 2010/0304749 A1 | 12/2010 | Dwyer et al. | |
| 2010/0317349 A1 | 12/2010 | Serravalle | |
| 2011/0064059 A1 | 3/2011 | Hooli et al. | |
| 2011/0110327 A1 | 5/2011 | Ramachandran et al. | |
| 2011/0171926 A1 | 7/2011 | Faccin et al. | |
| 2011/0176424 A1 | 7/2011 | Yang et al. | |
| 2011/0216732 A1 | 9/2011 | Maeda et al. | |
| 2012/0322447 A1 | 12/2012 | Ramachandran et al. | |

FOREIGN PATENT DOCUMENTS

| | | |
|---|---|---|
| EP | 1503608 | 2/2005 |
| EP | 2146540 A1 | 1/2010 |
| EP | 2249607 A1 | 11/2010 |
| JP | 60077259 | 5/1985 |
| JP | 05075530 | 3/1993 |
| JP | 05244075 | 9/1993 |
| JP | 10322760 | 12/1998 |
| JP | 2000175243 | 6/2000 |
| JP | 2004312721 A | 11/2004 |
| JP | 2004356684 A | 12/2004 |
| JP | 2006060295 A | 3/2006 |
| JP | 2008502253 A | 1/2008 |
| JP | 2010187422 A | 8/2010 |
| JP | 2012526407 A | 10/2012 |
| KR | 20060114947 A | 11/2006 |
| KR | 20070069930 A | 7/2007 |
| WO | 0022853 A1 | 4/2000 |
| WO | 0158054 A1 | 8/2001 |
| WO | 0195504 A2 | 12/2001 |
| WO | WO-03084095 | 10/2003 |
| WO | 2005122621 A1 | 12/2005 |
| WO | WO2007086679 A1 | 8/2007 |
| WO | 2007113457 A1 | 10/2007 |
| WO | 2008099341 A2 | 8/2008 |
| WO | 2008157713 | 12/2008 |
| WO | 2009007720 | 1/2009 |
| WO | 2009020874 | 2/2009 |
| WO | WO-2010127435 A1 | 11/2010 |
| WO | WO-2011024310 A1 | 3/2011 |

OTHER PUBLICATIONS

Ericsson: "Ericsson comments on NSP problems", 3GPP Draft; NSW-060015-ERICSSON-NSP-COMMENTS, 3rd Generation Partnership Project (3GPP), Mobile Competence Centre ; 650, Route Des Lucioles ; F-06921 Sophia-Antipolis Cedex ; France, no. Amsterdam, Netherlands; 20060124-20060125, Jan. 18, 2006, XP050647762, [retrieved on Jan. 18, 2006].

International Search Report and Written Opinion—PCT/US2012/050962—ISA/EPO—Oct. 27, 2012.

Nokia Siemens Networks et al: "1 Introduction 2 Operation in a multi-RAT scenario", 3GPP Draft; GP-071684 Interworking Priorities, 3rd Generation Partnership Project (3GPP), Mobile Competence Centre; 650, Route Des Lucioles; F-06921 Sophia-Antipolis Cedex; France, vol. TSG GERAN, no. Vancouver, Canada; 20071112-20071116, Nov. 7, 2007, XP050594012, [retrieved on Nov. 7, 2007].

Tamea, et al., "A Probability based Vertical Handover Approach to Prevent Ping-Pong Effect," 2009 6th International Symposium on Wireless Communication Systems (ISWCS 2009), Sep. 7-10, 2009, Tuscany, IEEE, pp. 181-185.

3GPP TS 25.304 V4.0.0 (Mar. 2001) 3rd Generation Partnership Project: Technical Specification Group Radio Access Network; UE prodecures in Idle Mode and Procedures for Cell Reselection in Connected Mode (Release 4) Mar. 27, 2001.

3GPP TS 25.304 V6.4.0 (Dec. 2004) 3rd Generation Partnership Project: Technical Specification Group Radio Access Network; UE prodecures in Idle Mode and Procedures for Cell Reselection in Connected Mode (Release 6) Dec. 31, 2004.

3GPP TS 36.304 V10.1.0 (Mar. 2011) 3rd Generation Partnership Project; Technical Specification Group Radio Access Network; Evolved Universal Terrestrial Radio Access (E-UTRA); User Equipment (UE) procedures in idle mode (Release 10), 33 pages.

3GPP TS 36.331 V10.1.0 (Mar. 2011) 3rd Generation Partnership Project; Technical Specification Group Radio Access Network; Evolved Universal Terrestrial Radio Access (E-UTRA); Radio Resource Control (RRC); Protocol specification (Release 10), 290 pages.

3GPP TS 44.018, "Mobile radio interface layer 3 specification; Radio Resource Control (RRC) protocol", V9.8.0, Release 9, Mar. 2011, pp. 1-431.

3rd Generation Partnership Project; Technical Specification Group Core Network and Terminals; Non-Access-Stratum (NAS) functions related to Mobile Station (MS) in idle mode (Release 10), 3GPP Standard; 3GPP TS 23.122, 3RD Generation Partnership Project (3GPP), Mobile Competence Centre; 650, Route Des Lucioles; F-06921 Sophia-Antipolis Cedex; France, No. V10.3.0, Mar. 1, 2011, pp. 1-43, XP050476762, [retrieved on Apr. 1, 2011].

3rd Generation Partnership Project; Technical Specification Group GSM/EDGE Radio Access Network; Radio subsystem link control (Release 10), 3GPP Standard; 3GPP TS 45.008, 3RD Generation Partnership Project (3GPP), Mobile Competence Centre; 650, Route Des Lucioles; F-06921 Sophia-Antipolis Cedex; France, No. V10.0.0, Mar. 1, 2011, pp. 1-148, XP050476679, [retrieved on Apr. 1, 2011].

3rd Generation Partnership Project "UE Procedures in Idle Mode and Procedures for Cell Reselection in Connected Mode (Release 4)", Jun. 2002.

* cited by examiner

METHODS AND APPARATUS FOR RADIO ACCESS TECHNOLOGY SEARCH

CLAIM OF PRIORITY UNDER 35 U.S.C. §119

The present Application for Patent claims priority to U.S. Provisional Application No. 61/498,413, entitled, "Methods and Apparatus for Radio Access Technology Search," filed Jun. 17, 2011, and assigned to the assignee hereof and hereby expressly incorporated by reference herein.

TECHNICAL FIELD

Certain aspects of the disclosure relate generally to wireless communications systems and, more particularly, to methods and apparatus for search of radio access technologies (RAT).

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-single-out (MISO) or a multiple-in-multiple-out (MIMO) system.

Additionally, a wireless communication system may include multiple cells supporting a variety of radio access technologies (RAT). As infrastructure is added to the wireless communication system to support a new RAT, interoperability issues between older RATs and newer RATs may arise. As such, there is a need for techniques and apparatus for managing transitions between cells utilizing different RATs.

SUMMARY

Certain aspects of the present disclosure provide a method for wireless communications by a user equipment utilizing a first radio access technology (RAT) in a first cell. The method generally includes searching for service coverage by a second RAT in one or more neighboring cells if the first cell does not advertise information about neighboring cells that utilize the second RAT, identifying a second cell that utilizes the second RAT, evaluating criteria for cell reselection from the second cell to the first cell while still camping on the first cell, and deciding whether or not to switch to the second cell based on the evaluation.

Certain aspects of the present disclosure provide an apparatus for wireless communications utilizing a first radio access technology (RAT) in a first cell. The apparatus generally includes means for searching for service coverage by a second RAT in one or more neighboring cells if the first cell does not advertise information about neighboring cells that utilize the second RAT, means for identifying a second cell that utilizes the second RAT, means for evaluating criteria for cell reselection from the second cell to the first cell while still camping on the first cell, and means for deciding whether or not to switch to the second cell based on the evaluation.

Certain aspects provide a computer-program product for wireless communications by a user equipment utilizing a first radio access technology (RAT) in a first cell, comprising a computer-readable medium having instructions stored thereon, the instructions being executable by one or more processors. The instructions generally include instructions for searching for service coverage by a second RAT in one or more neighboring cells if the first cell does not advertise information about neighboring cells that utilize the second RAT, instructions for identifying a second cell that utilizes the second RAT, instructions for evaluating criteria for cell reselection from the second cell to the first cell while still camping on the first cell, and instructions for deciding whether or not to switch to the second cell based on the evaluation.

Certain aspects of the present disclosure provide an apparatus for wireless communications utilizing a first radio access technology (RAT) in a first cell. The apparatus generally includes at least one processor and a memory coupled to the at least one processor. The at least one processor configured to search for service coverage by a second RAT in one or more neighboring cells if the first cell does not advertise information about neighboring cells that utilize the second RAT, identify a second cell that utilizes the second RAT, evaluate criteria for cell reselection from the second cell to the first cell while still camping on the first cell, and decide whether or not to switch to the second cell based on the evaluation.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
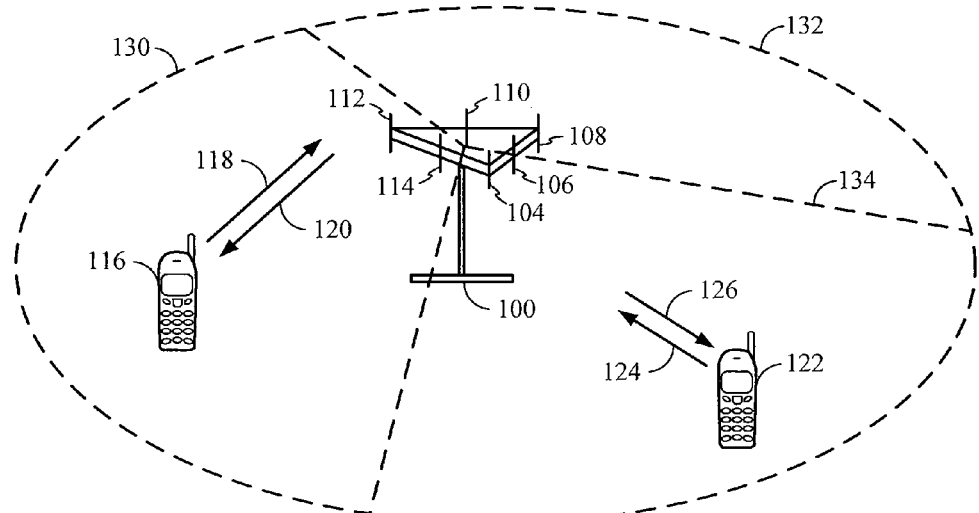
FIG. 1 illustrates a multiple access wireless communication system.

A wireless multiple-access communication system may support multiple radio access technologies (RAT). Examples of RATs include, e.g., Universal Mobile Telecommunications System (UMTS), Global System for Mobile Communications (GSM), cdma2000, WiMAX, WLAN (e.g., WiFi), Bluetooth, Long Term Evolution (LTE), LTE-Advanced, and the like. As newer RATs are released, infrastructure of the wireless communication system may be augmented to support the newer RATs and protocols. Additionally, the existing infrastructure of the wireless communication system may be updated to support interoperability between legacy RATs and current RATs (e.g., between GSM and LTE). However, in some cases, upgraded systems may overlap with non-upgraded system which may create inoperability issues.

For example, LTE systems may overlap with old legacy GSM EDGE Radio Access Network (GERAN) deployments, in which EDGE stands for Enhanced Data rates for GSM Evolution, where operators may not have upgraded the existing infrastructure to support GSM-to-LTE inter-RAT transitions. In other words, the GERAN base stations in these legacy networks may not direct a UE to LTE service and may not broadcast LTE neighbors or cell reselection information in system broadcast channels, such as System Information 2 Quater (SI2Q) messages. However, in such areas, the LTE systems may still support LTE-to-GSM inter-RAT mobility. Accordingly, in such networks, if a user equipment (UE) were to transition from LTE to GSM, such as through cell reselection, redirection, cell change orders (CCOs), or out-of-service (OOS) mobility behavior, the UE may not return to LTE service unless the UE loses GSM coverage or is power cycled. Accordingly, there is a need for improved apparatus and techniques of managing inter-RAT transitions in areas lacking RAT interworking. According to certain aspects, methods and apparatus for periodic higher priority RAT search and scan within a serving PLMN are provided.

For purposes of the detailed discussion below, a wireless communication system including user equipment supporting LTE and GSM are described, though the certain aspects provided below may be applied to other configurations of user equipment supporting various combinations of multiple RATs, including those listed above. Also, while certain aspects of the present disclosure generally refer to GSM as a legacy RAT having lower priority than LTE, it is understood that certain aspects may be extended to those cases where GSM may be given an equal or higher priority than LTE. In addition, in general, the proposed techniques may be used for transition from any other lower priority RAT to a higher priority RAT in a wireless network.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access schemes in 3GPP Long Term Evolution (LTE), or Evolved UTRA, and/or LTE Advanced.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an wireless terminal, a user terminal, a user agent, a user device, user equipment ("UE"), a user station, a subscriber station, a subscriber unit, a mobile station, a remote station, a remote terminal, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects described herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) includes multiple antenna groups, one including antennas 104 and 106, another including antennas 108 and 110, and yet another including antennas 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 104 and 106, where antennas 104 and 106 transmit information to access terminal 122 over forward link 126 and receive information from access terminal 122 over reverse link 124. In a Frequency division duplex (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access point. In the aspect shown in FIG. 1, each antenna group is designed to communicate to access terminals in one sector of the areas covered by access point 100. FIG. 1 shows that the coverage area of the access point 100 is partitioned into three sectors 130, 132, and 134. Access terminal 116 is in communication with the sector 130 of access point 100, and access terminal 122 is in communication with the sector 134. Sector 132 is a non-serving sector in the aspect shown in FIG. 1.

In communication over forward links 120 and 126, the transmitting antennas of access point 100 may utilize beamforming in order to improve the signal-to-noise ratio (SNR) of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
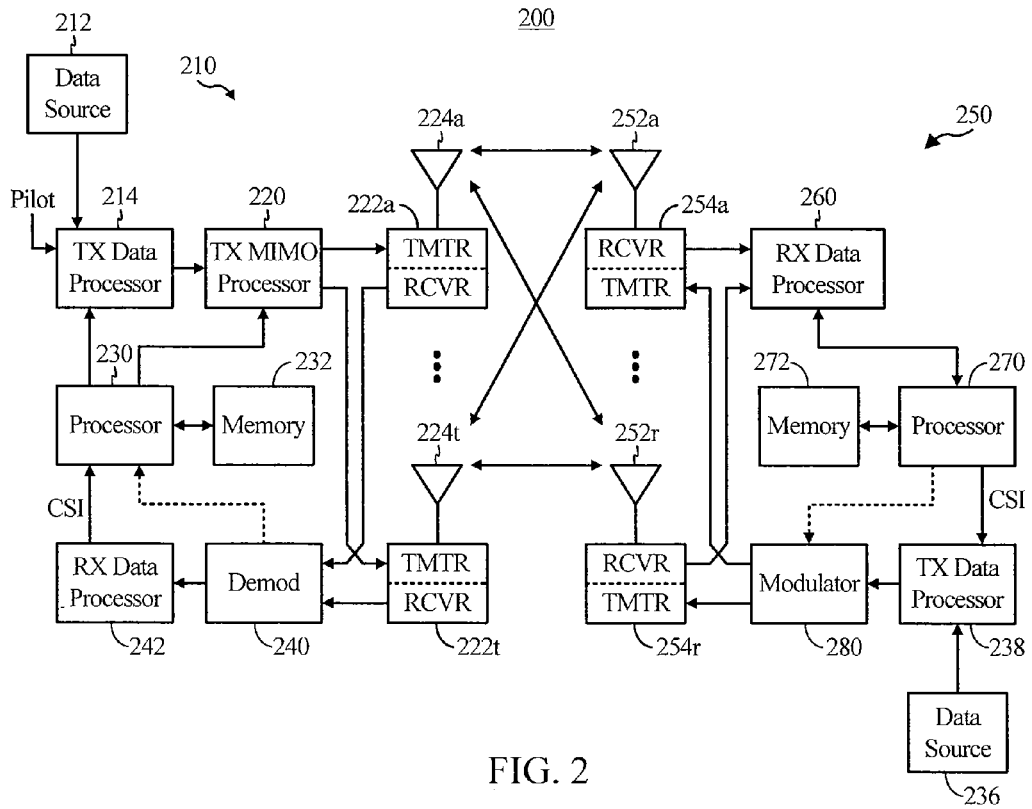
FIG. 2 is a block diagram of a communication system.

FIG. 2 is a block diagram of an aspect of a transmitter system 210 (also known as the access point) and a receiver system 250 (also known as the access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., binary phase shift keying (BPSK), Quadrature phase shift keying (QPSK), M-PSK, or M-QAM (Quadrature Amplitude Modulation), in which M may be a power of two) selected for that data stream to provide modulation symbols. The data rate, coding, and modulation for each data stream may be determined by instructions performed by processor 230 that may be coupled to the memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270, which may be coupled to the memory 272, periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Processors 230 and 270 can direct (e.g., control, coordinate, manage, etc.) operation at base station 210 and mobile device 250, respectively. Respective processors 230 and 270 can be associated with memory 232 and 272 that store program codes and data. Processors 230 and 270 can also perform computations to derive frequency and impulse response estimates for the uplink and downlink, respectively. All "processor" functions can be migrated between and among process modules such that certain processor modules may not be present in certain embodiments, or additional processor modules not illustrated herein may be present.

Memory 232 and 272 (as with all data stores disclosed herein) can be either volatile memory or nonvolatile memory or can include both volatile and nonvolatile portions, and can be fixed, removable or include both fixed and removable portions. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink™ DRAM (SLDRAM), and direct Rambus™ RAM (DRRAM). Memory of the certain embodiments is intended to comprise, without being limited to, these and any other suitable types of memory.

According to certain aspects, the receiver system 250 may be configured to support a plurality of RATs. According to certain aspects, the receiver system 250 may be configured to support a first RAT comprising GSM and a second RAT comprising LTE. According to certain aspects, various components of the receiver system 250, such as the processor 270 and TX data processor 238, may be configured to implement techniques for periodic higher priority RAT search as described herein. According to certain aspects, the processor 270 may be configured to evaluate criteria for cell reselection from a LTE cell to a GSM cell while camping on the GSM cell. According to certain aspects, the processor 270 may be configured to initiate a connection to the LTE cell based on the evaluation.

It is generally understood that logical channels are classified into Control Channels and Traffic Channels. Logical Control Channels comprise a Broadcast Control Channel (BCCH) which is a DL channel for broadcasting system control information, a Paging Control Channel (PCCH) which is a DL channel that transfers paging information, and a Multicast Control Channel (MCCH) which is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+MSCH). Dedicated Control Channel (DCCH) is a point-to-point bi-directional channel that transmits dedicated control information and used by UEs having an RRC connection. In an aspect, Logical Traffic Channels comprise a Dedicated Traffic Channel (DTCH) which is a point-to-point bi-directional channel, dedicated to one UE, for the transfer of user information. Also, a Multicast Traffic Channel (MTCH) is a point-to-multipoint DL channel for transmitting traffic data.

It is further understood that Transport Channels are classified into DL and UL. DL Transport Channels comprise a Broadcast Channel (BCH), a Downlink Shared Data Channel (DL-SDCH) and a Paging Channel (PCH), the PCH for support of UE power saving (Discontinuous Reception (DRX) cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

A Public Land Mobile Network (PLMN) may be established and operated by an administration or Recognized Private Operating Agency (RPOA) for the specific purpose of providing land mobile telecommunications services to the public. The PLMN is typically the mobile network run by one network operator in one country. The Home Public Land Mobile Network (HPLMN) is a PLMN where the Mobile Country Code (MCC) and Mobile Network Code (MNC) of the PLMN identity are the same as the MCC and MNC of the International Mobile Subscriber Identity (IMSI) or the defined Equivalent HPLMN (EHPLMN). The International Mobile Subscriber Identity (IMSI) is a unique number associated with each mobile phone user. The IMSI is stored in the Subscriber Identity Module (SIM) inside the phone and is sent by the phone to the network. The IMSI is primarily intended for obtaining information on the use of the Public Land Mobile Network (PLMN) by subscribers. The Equivalent Home Public Land Mobile Network (EHPLMN) may be any PLMN which is listed in the Universal Subscriber Identity Module (USIM) of a mobile terminal as being equivalent to the Home PLMN (HPLMN). Any EHPLMN may be treated as the HPLMN in all network and cell selection procedures.

An Exemplary Periodic Higher Priority Rat Search

As described above, older legacy networks, such as GSM may not be configured to interoperate with overlapping newer networks (e.g., LTE networks). For example, these legacy networks may not advertise information about the neighboring cells in the newer networks. As a result, a UE that is camped on these legacy networks may not be aware of availability of the newer networks in its vicinity. For example, when a legacy GSM network overlaps with a new LTE network, the legacy GSM network may not advertise neighboring LTE cells to the UEs that are already camped on the GSM network as an updated GSM network would. Therefore, the UE may not become aware of the LTE neighboring cells. To overcome this limitation and provide opportunity for the UEs to camp on the newer network (e.g., LTE network), according to certain aspects, UEs may be configured to autonomously seek out service from the newer networks (e.g., LTE service). If a UE finds a cell that operates under the new network, the UE may camp on it.

It should be noted that in the present disclosure document, most of the examples may refer to GSM as a legacy network and to LTE as a newer network for simplicity of explanation. However, those skilled in the art would appreciate that any other older RAT (e.g., $2^{nd}$ generation (2G)) may be used instead of the GSM network and any other network in $3^{rd}$, $4^{th}$ or newer generations of the networks may be used instead of the LTE in the proposed higher priority RAT search, all of which would fall within the scope of the present disclosure.

Figure 3:
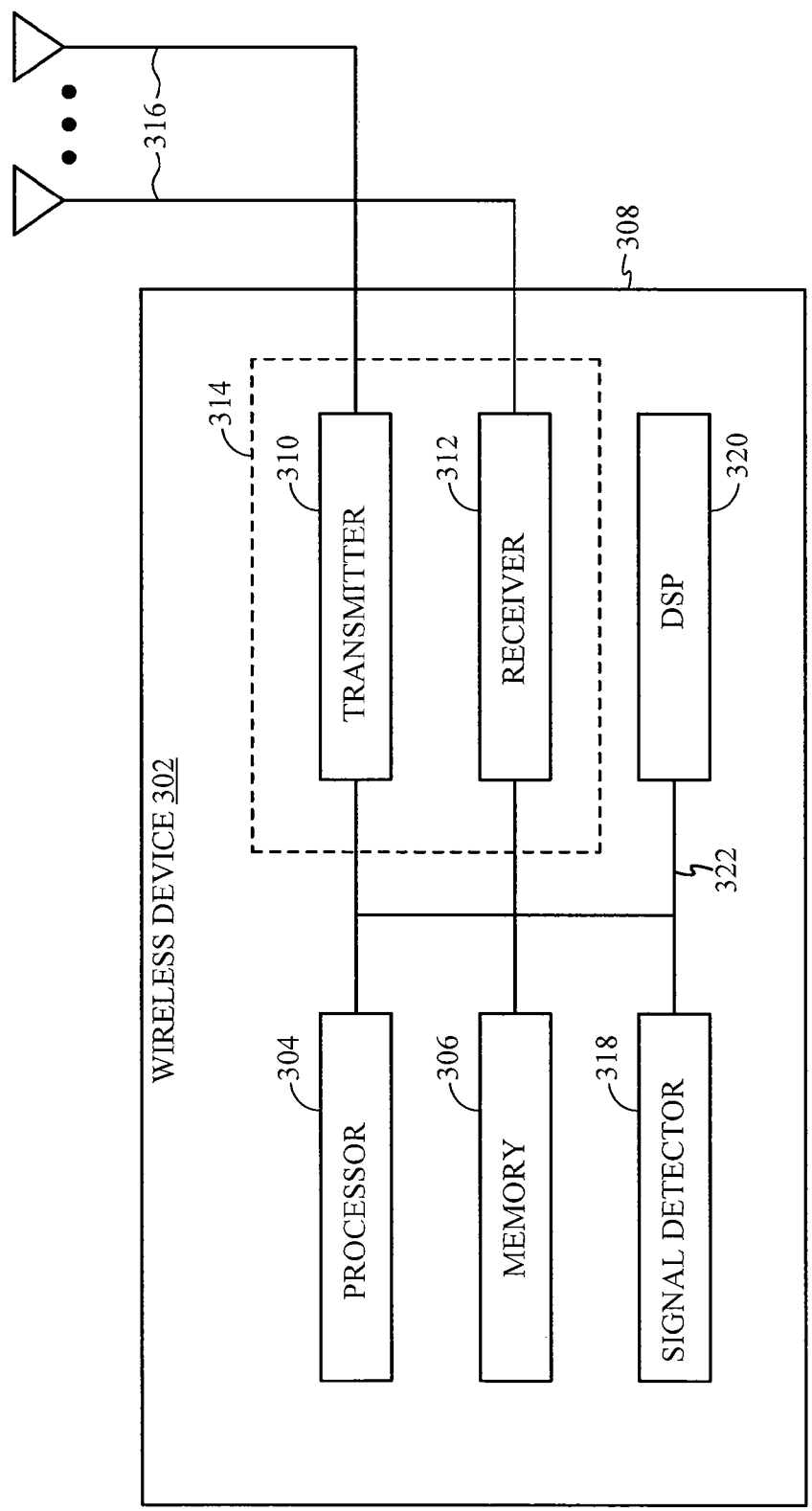
FIG. 3 illustrates various components that may be utilized in a wireless device, in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. While the wireless device 302 may be a base station 100 or any of user terminals 116 and 122 of FIG. 1, the below detailed description may interchangeably refer to the wireless device 302 as a UE 302.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). However, additional and/or other memories may be employed. The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

According to certain aspects, the signal detector 318 of the UE 302 may be configured to periodically scan for service from newer networks (e.g., LTE) using a proposed higher priority RAT search procedure while camped on a legacy cell (e.g., a GSM cell). Current higher priority PLMN scan procedures as defined in the 3GPP TS.23.122 search for service only on a higher priority non-equivalent PLMN. According to certain aspects, the proposed higher priority RAT search procedure may look for service on a higher priority RAT on the same PLMN (e.g., HPLMN) or an equivalent PLMN (e.g., EHPLMN). The proposed higher priority RAT search may use similar procedures as the ones defined for the higher priority PLMN scans (e.g., BPLMN (better-PLMN) search feature), but extend these procedures to be used on the HPLMN or EHPLMNs.

For certain aspects, the UE may be configured to periodically search for a higher priority RAT (e.g., LTE) service on the serving PLMN and/or on equivalent-PLMNs. Accordingly, a UE 302 may be configured to look for LTE service even if the wireless device is already camped on the highest priority PLMN available. For certain aspects, the highest priority PLMN may include the Home PLMN.

Figure 4:
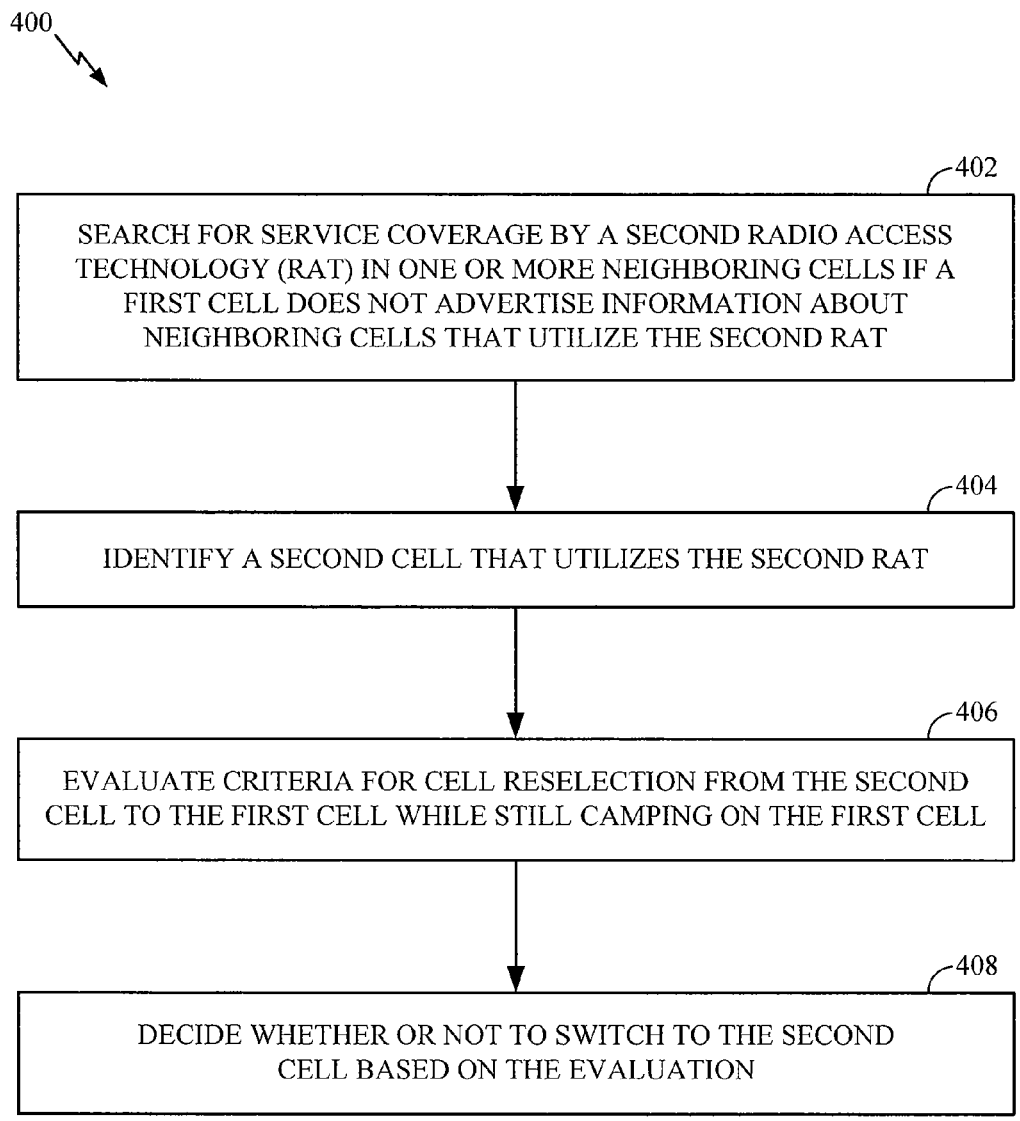
FIG. 4 illustrates example operations that may be performed by a wireless device to search for a radio access technology (RAT), in accordance with certain aspects of the present disclosure.

FIG. 4 illustrates example operations 400 that may be performed by a user equipment for managing inter-RAT transitions in accordance with certain aspects of the present disclosure. The UE may be served by a first cell utilizing a first RAT. The operations 400 may begin at 402 where the UE may search for service coverage by a second RAT in one or more neighboring cells if the first cell does not advertise information about neighboring cells that utilize the second RAT. According to certain aspects, the first RAT may comprise the GSM and the second RAT may comprise the LTE. At 404, the UE may identify a second cell that utilizes the second RAT. At 406, the UE may evaluate criteria for cell reselection from the second cell to the first cell while still camping on the first cell. At 408, the UE may decide whether or not to switch to the second cell based on the evaluation. According to certain aspects, the UE may be configured to determine whether the cell reselection criteria has been satisfied, and responsive to determining the criteria has not been satisfied, the UE may be configured to switch to the second cell.

According to certain aspects, the UE 302 may maintain a priority list of RATs (e.g., RAT_Priority_List) that may be used to determine the higher priority RATs while performing the periodic scans, or while looking for service on a higher priority RAT. As an example, the RAT_Priority_List that is stored in the UE may include a list of all the new networks with which the UE is capable of communicating. For example, the RAT_Priority_List may include the LTE network.

According to certain aspects, the UE may also maintain a configurable list of PLMNs (e.g., HP_RAT_PLMN) where the proposed higher priority RAT search feature described herein may be employed. For example, the UE may use the proposed higher priority RAT search procedure if the current PLMN is one of the PLMNs stored in the HP_RAT_PLMN list.

According to certain aspects, the UE 302 may also maintain a configurable list of the RATs (e.g., HP_RAT_Scan_List) where the proposed higher priority RAT search feature may be employed. The HP_RAT_Scan_List may include list of the legacy (or older) networks that if a UE is camped on, the UE should perform the proposed higher priority RAT search. For example, the configurable HP_RAT_Scan_List may contain the GSM RAT.

Figure 5:
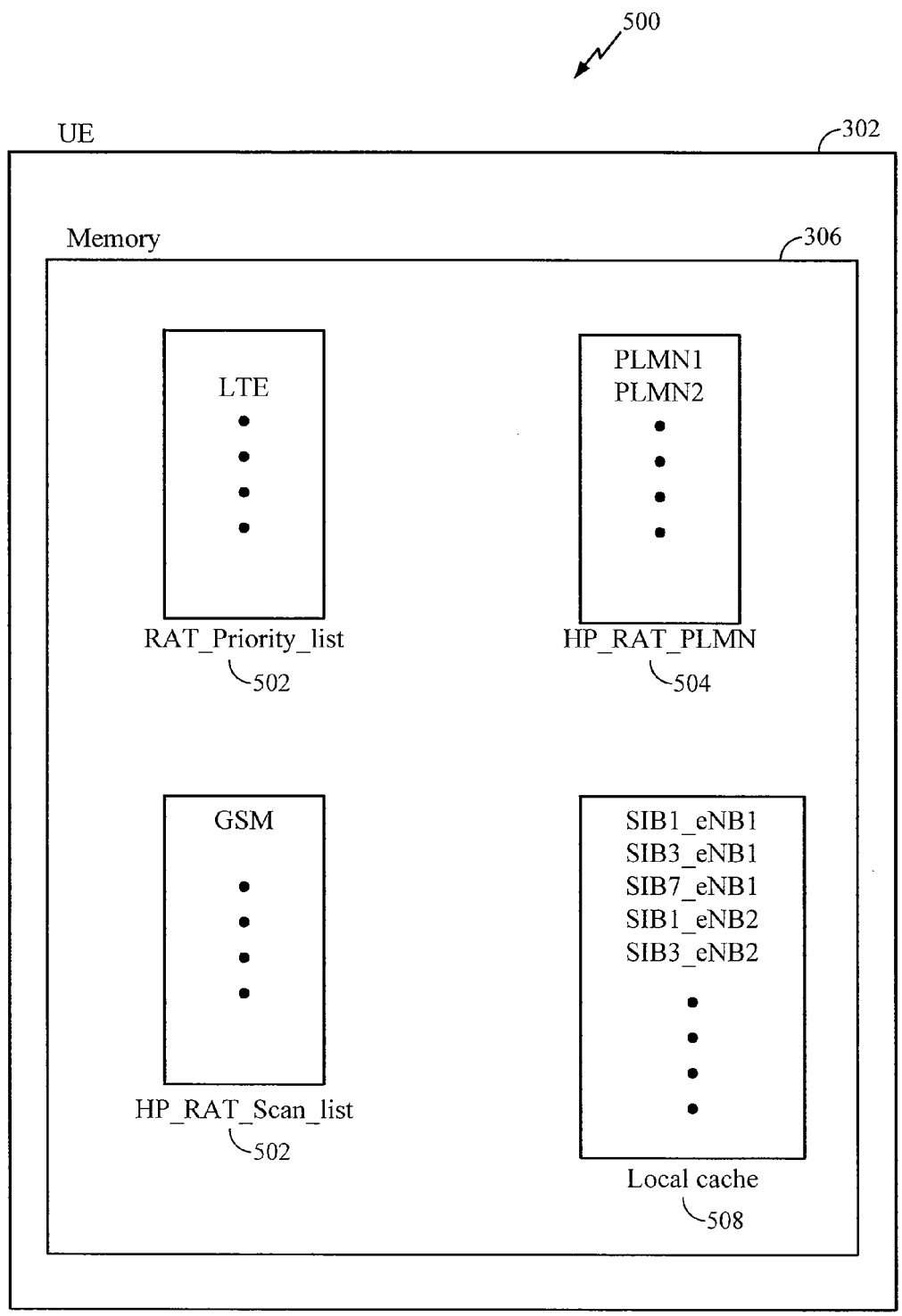
FIG. 5 illustrates example information that may be stored in the memory of a UE, in accordance with certain aspects of the present disclosure.

FIG. 5 illustrates example information that may be stored in the memory 306 of a UE 302, in accordance with certain aspects of the present disclosure. As illustrated, the memory may include RAT_Priority_List 502, HP_RAT_PLMN 504, HP_RAT_Scan_List 506 and a local cache 508 to store the parameters that may be used for the higher priority RAT search procedure. As an example, the RAT_Priority_List 502 may include the LTE RAT, the HP_RAT_PLMN 504 list may include name of two different PLMNs (e.g., PLMN1 and PLMN2), the HP_RAT_Scan_List 506 may include the GSM RAT and the local cache 508 may include system information about neighboring cells (e.g., eNB1 and eNB2). The UE 302 may use the information stored in the memory 306 to perform the higher priority RAT search procedure, as described herein.

In the example illustrated in FIG. 5, HP_RAT_Scan_List 506 includes the GSM RAT and the RAT_Priority_List 502 includes the LTE RAT. If the UE is in the PLMN1 network and is camped on the GSM RAT, it will perform the higher priority RAT search procedure to look for LTE service, even if LTE is not advertised in the list of the neighbors in the GSM network. According to certain aspects, the UE may perform the higher priority RAT search procedure when in idle mode.

It should be noted that periodically scanning for LTE service may adversely impact battery life and standby time of the UE 302. Therefore, the proposed higher priority RAT search may be regulated and/or restricted. For certain aspects, the periodic scanning may be restricted to the PLMNs for which such behavior is desired. For example, if a PLMN does not have any legacy networks, there is no need to perform the periodic search feature as described herein. The periodic scan for higher priority services may be used in a PLMN that has a legacy network (e.g. GSM). For certain aspects, such periodic scanning may be restricted to legacy cells in these PLMNs where list of neighbors that utilize newer networks (e.g., LTE neighbors) are not broadcasted.

According to certain aspects, the UE may maintain a configurable timer that governs the periodicity of the periodic higher priority RAT search feature. Therefore, periodicity of the higher priority RAT searches may be configured. In one aspect, the higher priority RAT search timer may be concurrent with the BPLMN timer (e.g., 6 minutes). According to certain aspects, the higher priority RAT search timer may be re-started whenever the UE is camped on a new cell. In an aspect, the UE may store information about one or more configurable timers in a list called HP_RAT_Scan_Period in memory 306.

According to certain aspects, at the expiry of the timer, the UE may perform the higher priority RAT search if the current PLMN is in the configurable list of PLMNs (e.g., HP_RAT_PLMN) where periodic higher priority RAT search may be employed. For example, the UE may perform a higher priority RAT search if the current RAT is GSM, and/or if the current camped GSM cell has not advertised any LTE neighbors, or if the currently camped GSM cell has not broadcast a System Information 2 Quater (SI2Q) message.

For certain aspects, the periodic timer may utilize a back-off scheme to configure (e.g., dynamically) the timer based on results of the higher priority RAT search (e.g., upon an unsuccessful search). For example, the UE may start a timer having an initial value x when the UE camps on a GSM cell. At the expiry of the timer after time x, the UE searches for LTE service. If no LTE service is found, the UE may start the timer with a larger initial value (e.g., value of 2x). At the expiry of the timer after time 2x, the UE may start the timer with an even larger initial value (e.g., with a value of Nx), and so on, where N is a progressively increasing number. For another aspect, the periodic timer may be backed-off exponentially.

According to certain aspects, the UE 302 may be configured to periodically scan for higher priority RAT on PLMNs that have indicated such periodic scans as allowable. The UE 302 may maintain a configurable list of PLMNs that have legacy cells (e.g., GSMs cells) which do not broadcast a complete list of all the possible neighboring RATs. For example, the legacy cells may not broadcast information about some of the newer RATs (e.g., information about LTE neighbors.).

According to certain aspects, the UE may be further configured to perform a periodic higher priority RAT search while camped in cells that do not support interoperability/interworking with the higher priority RAT, or do not advertise information about these higher priority RATs. According to certain aspects, the UE 302 may determine the camped cell in the search-permissible PLMNs does not broadcast and/or advertise some of the newer RATs (e.g., LTE neighbors). For example, in one implementation, the absence of a System Information 2 Quater (SI2Q) broadcast message may indicate to the UE 302 that the GSM cell may not be capable of broadcasting this type of message (i.e., SI2Q) and by inference that the GSM cell may not be capable of broadcasting information on LTE service that may exist in the neighborhood. The SI2Q message may be broadcast by a network periodically to provide a list of cells and frequencies used by other RATs. This list may be used by the UE to decide whether or not to select another cell.

On the other hand, the presence of the SI2Q broadcast message which does not list LTE neighbors may indicate to the UE 302 that the GSM cell/base station is capable of broadcasting this type of message and that there truly may not be any LTE service in the area. However, if SI2Q does not include any information about LTE neighbors, it may also indicate that the GSM network does not broadcast information about the (new) LTE networks in its vicinity. The UE may then utilize the proposed higher priority RAT search to search for LTE service.

The presence of the SI2Q message including cell information of LTE neighbors may indicate that the UE 302 may utilize standards-based GSM-to-LTE reselection procedures instead of the periodic scanning techniques described herein. In one aspect, the signal detector 318 may be configured to disable the periodic scanning feature accordingly. For example, if the UE finds out that the LTE neighbors are currently broadcasted, the UE may disable the periodic scanning feature, as described herein, and rely on the broadcast information to decide whether or not to switch to another RAT (e.g., LTE).

In some scenarios, an LTE cell may be configured to be of a higher RAT priority than a GSM cell on which a UE is currently camped. In this case, when the UE performs a periodic scan utilizing the techniques described herein and finds an LTE cell, transitions from the LTE cell to the GSM cell may be likely to occur. However, if the signal strength of the LTE cell is weak while signal strength of the GSM cell is strong, the UE may switch back from the LTE network to the GSM network if the GSM-to-LTE periodic search and LTE service selection is performed blindly. This may be viewed as a "ping-pong scenario" in which the UE moves (e.g., ping pongs) back and forth between the LTE and GSM cells. According to certain aspects, given that the criteria used by the UE to determine when to reselect from the LTE cell to the GSM cell is deterministic, the UE may evaluate the likelihood of the future transition from the LTE-to-GSM cell while still being camped on the GSM cell and scanning for service on the LTE RAT. In other words, the UE may pre-evaluate the cell reselection criteria of a future LTE-to-GSM transition before reselecting the LTE cell, and while still being camped on the GSM cell.

According to certain aspects, the UE may be configured to evaluate the cell reselection criteria based on system information that was collected and stored when the UE was previously camped on the second RAT. According to certain aspects, the cached system information may include one or more inter-RAT cell reselection parameters of one or more system information block (SIB) type messages (e.g., SIB1, SIB3, and SIB7).

System Information (SI) may consist of cell-specific and network-specific parameters which are broadcast to allow UEs to connect successfully to the network. System information may be structured into different types of System Information Blocks (SIB), each of which contains a set of functionally-related parameters. As an example, SIB Type 1 (SIB1) may contain NAS system information in addition to the UE timers and counters to be used in idle mode and in the connected mode. SIB Type 3 (SIB3) may contain parameters for cell selection and re-selection. SIB Type 7 (SIB7) may contain the fast changing parameters UL interference and dynamic persistence level.

As described above, the UE may first determine that the first cell does not support transitions from the first cell utilizing the first RAT to cells utilizing the second RAT (e.g., the first cell may not advertise neighboring LTE cells). According to certain aspects, the UE may determine the first cell does not support the inter-RAT transitions based on receiving a signal from the first cell (e.g., a SI2Q message).

For certain aspects, the UE may periodically scan for one or more cells utilizing the second RAT based on a configurable periodicity. According to certain aspects, the scanning periodicity may be configured to back-off if no service with the second RAT was found. According to certain aspects, the periodicity of the evaluation may also be backed-off if an insufficient level of service of the second RAT was found.

Figure 6:
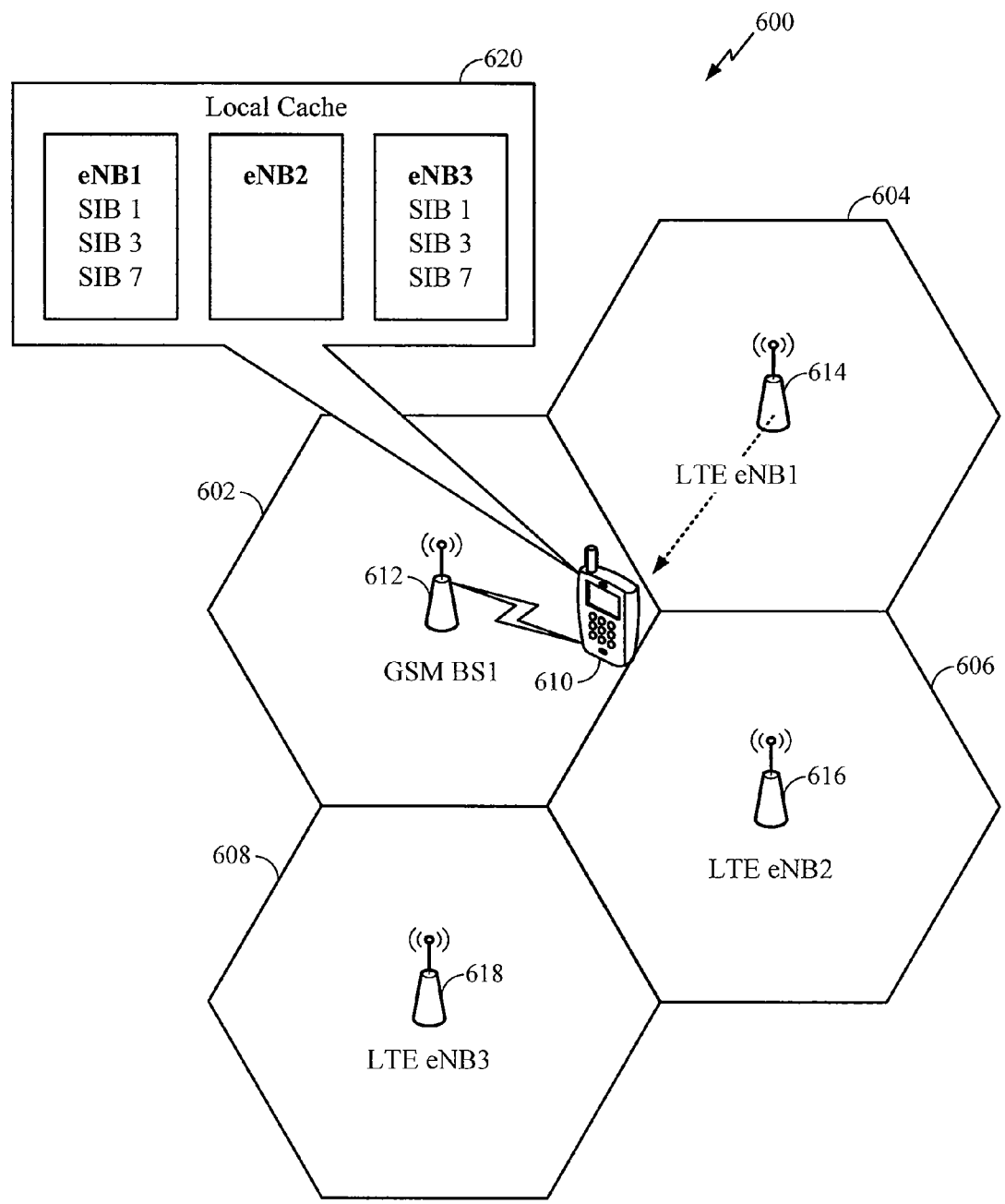
FIG. 6 illustrates an example topology of Long Term Evolution (LTE) coverage and Global System for Mobile communications (GSM) coverage in a wireless network, in accordance with certain aspects of the present disclosure.

FIG. 6 illustrates an example topology 600 of LTE coverage and GSM coverage in accordance with certain aspects of the present disclosure. As shown, the topology 600 includes a UE 610 camped to a GSM cell 602 established by a GSM base station ("GSM BS-1"). According to certain aspects, the UE 610 may initiate a periodic scan for LTE service. As shown, the UE 610 may discover neighboring LTE cells 604, 606, and 608 established by the LTE eNodeBs 614, 616, 618 ("LTE eNB1", "LTE eNB2", and "LTE eNB3").

According to certain aspects, a Radio Resource Management (RR) component of the UE 610 for GSM may determine whether to switch to the LTE cell 604 by pre-evaluating criteria for cell reselection from the LTE cell 604 where LTE service was found during the periodic scans to the serving GSM cell 602 (e.g., evaluate criteria for cell reselection from the LTE cell 604 to the GSM cell 602 while camped on the GSM cell 602). According to certain aspects, system information typically available to the LTE stack of the UE 610 may be made available to the GSM RR of the UE 610 for performing pre-evaluation. As such, according to certain aspects, the RR of the UE 610 may be configured to access a local cache 620 of the UE storing system information block (SIB) values collected during previous connections with the LTE cells 604, 606, and 608. As shown, the local cache 620 includes contents of SIB1, SIB3 and SIB7 messages from each of the LTE cells that are collected from previous visits to the LTE cells established by eNB1, eNB2 and eNB3.

According to certain aspects, the GSM RR of the UE 610 may retrieve a plurality of cached cell reselection parameters from the local cache 620 (e.g., local memory 306). In one implementation, the plurality of cached cell reselection parameters includes, but is not limited to, a Cell Identity parameter comprising a number identifying the cell (e.g., the LTE cell) within a PLMN (from SIB1), a $Q_{RxLevMin}$ parameter comprising a minimum signal strength at which the LTE cell must be received by the UE so as to be considered suitable for camping (from SIB1), a $Q_{RxLevMinOffset}$ parameter comprising a signal offset to the $Q_{RxLevMin}$ parameter that may be taken into account as a result of periodic search for a higher priority PLMN while camped normally in a PLMN (from SIB1), a $P_{max}$ parameter comprising a maximum transmission power a UE is permitted to use in the cell, a threshold value (e.g., $Threshold_{ServingLow}$) comprising a minimum signal level that must be fulfilled for camping on a serving cell (from SIB3), and a signal strength threshold value (e.g., $Threshold_{Low}$) comprising the minimum value that the signal strength of a lower priority inter-RAT cell may exceed to be considered a suitable cell reselection target (from SIB7). It is contemplated that other cell reselection parameters may be utilized according certain aspects of the present disclosure.

According to certain aspects, the UE 610 may be configured to update the local cache 620 with the above described information whenever camped on a higher priority RAT cell (e.g., LTE cell). According to certain aspects, upon finding an LTE cell, the UE may read at least the Master Information Block (MIB) and the SIB1 broadcast in the cell. Additionally, while the UE is waiting for SIB1 to be received, if SIB3 and SIB7 are received, the cache may be updated appropriately. In one implementation, the UE may use the signal strength of the found LTE cell, and if available, the latest contents of the SIBs broadcast by the found LTE eNodeB. If the stored SIB information is not available, the UE may not perform pre-evaluation of the cell reselection criteria.

According to certain aspects, the UE 610 may be configured to perform pre-evaluation by comparing the signal strength of the found LTE cell to the $Threshold_{ServingLow}$ parameter advertised by that cell, as retrieved from the local cache 620.

For certain aspects, if the UE 610 is unable to pre-evaluate cell reselection criteria, the UE 610 may be configured to receive system information (e.g., associated with the second cell or other neighboring cells) over the air and cache the system information such that the cached system information may be used in subsequent pre-evaluating. On the other hand, if the UE 610 is unable to pre-evaluate the LTE-to-GSM cell reselection criteria, the UE 610 may simply select the LTE eNodeB (e.g., LTE eNB1 614) and camp on it. Once camped, the UE 610 may collect the above mentioned information (e.g., SIBs) and add them to the local cache 620. According to certain aspects, should the UE 610 reselect the GSM cell 602, this collected information may be able to assist in preventing future ping-pong scenarios.

According to certain aspects, if criterion pre-evaluation for cell reselection from the found LTE cell to the serving GSM cell was unable to be performed, or was not performed, or resulted in the LTE-to-GSM reselection criteria not being met, then the UE may select and handover to the higher priority RAT cell. Otherwise, the UE may remain on the serving GSM cell and restart the higher priority RAT search timer described above.

It is understood that the pre-evaluation performed by the GSM RR of the UE 610 may be an approximation of the cell reselection criterion, because the criteria is not actually evaluated for the duration of $T_{reselect}$ (e.g., the time duration for which a qualifying inter-RAT cell reselection target must continue to qualify to be a target so that cell reselection can be performed) as per the cell reselection procedure. However, it is further understood that the pre-evaluated cell reselection criterion may be utilized to provide insight into the likelihood of a ping pong scenario should the UE 610 reselect from the serving GSM cell to the LTE cell.

For certain aspects, the UE may perform a simpler form of pre-evaluation of cell re-selection by comparing the signal strength of the found cell (e.g., LTE cell) with the value of the lowest allowable signal strength for the serving cell (e.g., $Threshold_{ServLow}$) that may be stored in the cache.

Additionally, according to certain aspects, the UE may handle race conditions between cell reselection, mobile-originated (MO) or mobile-terminated (MT) call origination and the periodic higher priority RAT search in the same manner as handling race conditions with higher priority PLMN scans, as described in the standards.

Figure 7:
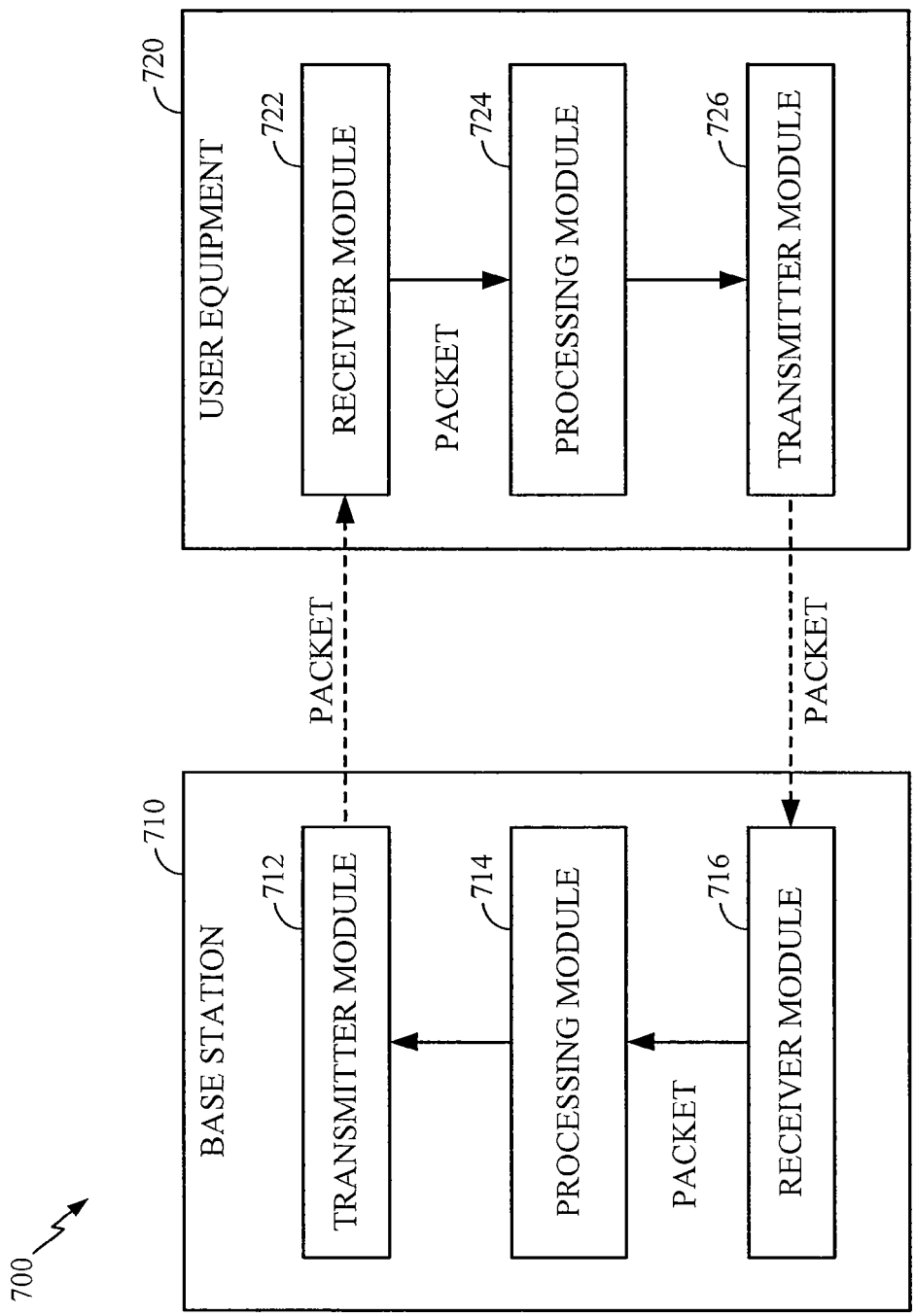
FIG. 7 illustrates an example communication system utilizing higher priority RAT search, in accordance with certain aspects of the present disclosure.

FIG. 7 illustrates an example communication system 700 utilizing higher priority RAT search, in accordance with certain aspects of the present disclosure. The communication system 700 includes a base station (e.g., eNodeB) 710 and a UE 720. The base station may use a first RAT to communicate with the UE. The base station includes a transmitter module 712 for transmitting packets to the UE, a processing module 714 for processing the packets received from the UE, and a receiver module 716 for receiving packets from the UE. The UE 720 receives one or more packets with the receiver module 722. The processing module 724 processes the packets received from the base station 710. In addition, the processing module may identify if the base station 710 transmits any information about newer RATs (e.g., higher priority RATs) in the vicinity or not. If the UE determines that the base station 710 does not advertise any information about neighboring cells that use higher priority RATs, the processing module may inform the receiver 722 to scan for signals from higher priority RATs. If the UE finds a second RAT with higher priority in its vicinity, the processing module may then pre-evaluate the reselection criteria from the second RAT to the first RAT while still being camped on the first RAT. The processing module may then decide whether or not to handover to a second base station (not shown) that utilizes the second RAT. The transmitter module 726 may transmit signals to the second base station to initiate a handover procedure to handover to the second base station.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for searching, means for receiving and/or means for scanning may comprise a receiver, such as the receiver unit 254*a*, of the receiver system 250 shown in FIG. 2. Means for performing a handover may comprise a transmitter, such as the transmitter unit 254*r*. Means for evaluating, means for determining, means for deciding, means for storing and/or means for modifying may comprise a processing system, which may include one or more processors, such as the processor 270 of the receiver system 250 illustrated in FIG. 2. These means may also comprise any suitable combination of the transmitters 310, the receiver 312, the signal detector 318, and/or the DSP 320 of FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications by a user equipment utilizing a first radio access technology (RAT) in a first cell, comprising:
   searching for service coverage by a second RAT in one or more neighboring cells if the first cell does not advertise information about neighboring cells that utilize the second RAT;
   identifying a second cell that utilizes the second RAT;
   evaluating criteria for cell reselection from the second cell to the first cell while still camping on the first cell; and
   deciding whether or not to switch to the second cell based on the evaluation.

2. The method of claim 1, wherein the evaluating comprises determining whether the cell reselection criteria has been satisfied, and wherein the deciding comprises switching to the second cell responsive to determining the cell reselection criteria has not been satisfied.

3. The method of claim 1, wherein the evaluating further comprises evaluating based on stored system information collected while connected to one or more cells utilizing the second RAT.

4. The method of claim 3, wherein the stored system information comprises one or more parameters received from one or more system information blocks (SIBs).

5. The method of claim 1, wherein searching for service coverage by the second RAT in the one or more neighboring cells comprises:
   periodically scanning for service coverage by the second RAT in the one or more neighboring cells based on a configurable periodicity.

6. The method of claim 5, further comprising:
   modifying the periodicity based on whether service coverage for the second RAT has been found.

7. The method of claim 1, further comprising:
   determining whether the first cell advertises information about the one or more neighboring cells that utilize the second RAT.

8. The method of claim 7, further comprising:
   receiving a signal from the first cell comprising a System Information 2 Quater (SI2Q) message; and
   determining if any information about cells utilizing the second RAT is present in SI2Q message.

9. The method of claim 1, wherein the evaluating further comprises:
   determining whether a signal strength of the second cell exceeds a stored threshold value representing a minimum signal strength for camping on the second cell, wherein the threshold value was previously advertised by the second cell.

10. The method of claim 1, further comprising:
    determining the cell reselection criteria are unable to be evaluated;
    performing a handover procedure to handover to the second cell; and storing one or more parameters from system information associated with the second cell in a memory, wherein the stored system information is used in subsequent evaluating of the cell reselection criteria.

11. The method of claim 1, further comprising:
determining the cell reselection criteria are unable to be evaluated;
receiving system information associated with the second cell over the air; and storing the system information, wherein the stored system information is used in subsequent evaluating.

12. The method of claim 1, wherein the first RAT comprises Global System for Wireless Communications (GSM) standard, and wherein the second RAT comprises Long Term Evolution (LTE) standard.

13. The method of claim 1, wherein the second RAT is part of a serving public land mobile network (PLMN) of the user equipment or an equivalent PLMN.

14. An apparatus for wireless communications utilizing a first radio access technology (RAT) in a first cell, comprising:
means for searching for service coverage by a second RAT in one or more neighboring cells if the first cell does not advertise information about neighboring cells that utilize the second RAT;
means for identifying a second cell that utilizes the second RAT;
means for evaluating criteria for cell reselection from the second cell to the first cell while still camping on the first cell; and
means for deciding whether or not to switch to the second cell based on the evaluation.

15. The apparatus of claim 14, wherein the means for evaluating comprises means for determining whether the cell reselection criteria has been satisfied, and wherein the means for deciding comprises means for switching to the second cell responsive to determining the cell reselection criteria has not been satisfied.

16. The apparatus of claim 14, wherein the means for evaluating further comprises means for evaluating based on stored system information collected while connected to one or more cells utilizing the second RAT.

17. The apparatus of claim 16, wherein the stored system information comprises one or more parameters received from one or more system information blocks (SIBs).

18. The apparatus of claim 14, wherein means for searching for service coverage by the second RAT in the one or more neighboring cells comprises:
means for periodically scanning for service coverage by the second RAT in the one or more neighboring cells based on a configurable periodicity.

19. The apparatus of claim 18, further comprising:
means for modifying the periodicity based on whether service coverage for the second RAT has been found.

20. The apparatus of claim 14, further comprising:
means for determining whether the first cell advertises information about the one or more neighboring cells that utilize the second RAT.

21. The apparatus of claim 20, further comprising:
means for receiving a signal from the first cell comprising a System Information 2 Quater (SI2Q) message; and
means for determining if any information about cells utilizing the second RAT is present in SI2Q message.

22. The apparatus of claim 14, wherein the means for evaluating further comprises:
means for determining whether a signal strength of the second cell exceeds a stored threshold value representing a minimum signal strength for camping on the second cell, wherein the threshold value was previously advertised by the second cell.

23. The apparatus of claim 14, further comprising:
means for determining the cell reselection criteria are unable to be evaluated;
means for performing a handover procedure to handover to the second cell; and
means for storing one or more parameters from system information associated with the second cell in a memory, wherein the stored system information is used in subsequent evaluating of the cell reselection criteria.

24. The apparatus of claim 14, further comprising:
means for determining the cell reselection criteria are unable to be evaluated;
means for receiving system information associated with the second cell over the air; and
means for storing the system information, wherein the stored system information is used in subsequent evaluating.

25. The apparatus of claim 14, wherein the first RAT comprises Global System for Wireless Communications (GSM) standard, and wherein the second RAT comprises Long Term Evolution (LTE) standard.

26. The apparatus of claim 14, wherein the second RAT is part of a serving public land mobile network (PLMN) of the apparatus or an equivalent PLMN.

27. A computer-program product for wireless communications by a user equipment utilizing a first radio access technology (RAT) in a first cell, comprising a non-transitory computer readable medium having instructions stored thereon, the instructions being executable by one or more processors and the instructions comprising:
instructions for searching for service coverage by a second RAT in one or more neighboring cells if the first cell does not advertise information about neighboring cells that utilize the second RAT;
instructions for identifying a second cell that utilizes the second RAT;
instructions for evaluating criteria for cell reselection from the second cell to the first cell while still camping on the first cell; and
instructions for deciding whether or not to switch to the second cell based on the evaluation.

28. An apparatus for wireless communications utilizing a first radio access technology (RAT) in a first cell, comprising:
at least one processor configured to:
search for service coverage by a second RAT in one or more neighboring cells if the first cell does not advertise information about neighboring cells that utilize the second RAT;
identify a second cell that utilizes the second RAT;
evaluate criteria for cell reselection from the second cell to the first cell while still camping on the first cell; and
decide whether or not to switch to the second cell based on the evaluation; and
a memory coupled to the at least one processor.

* * * * *